G. E. KIPP.
SHUT-OFF DEVICE FOR CARBURETERS AND THE LIKE.
APPLICATION FILED FEB. 13, 1920.
1,348,226. Patented Aug. 3, 1920.
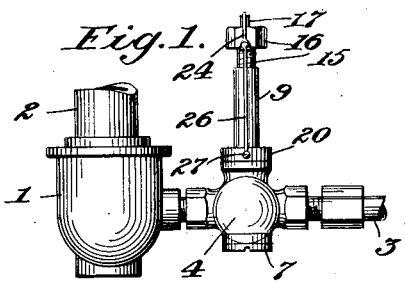
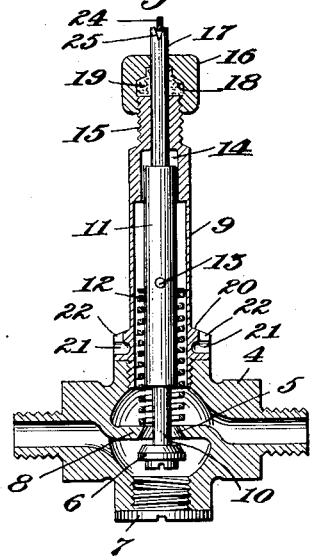 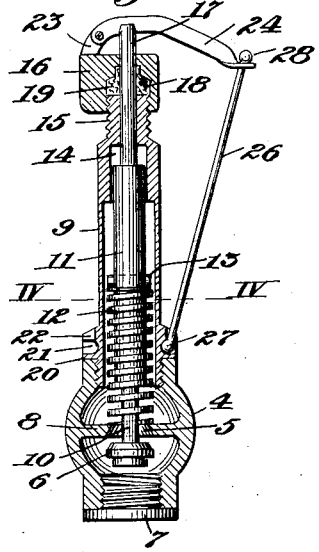
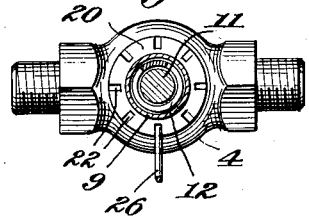
Inventor:
George E. Kipp,
By Chas. E. Riordon
Att'y.

UNITED STATES PATENT OFFICE.

GEORGE E. KIPP, OF NIVERVILLE, NEW YORK, ASSIGNOR OF ONE-FOURTH TO ROBERT J. KIPP, ONE-FOURTH TO CHARLES H. WINSLOW, AND ONE-FOURTH TO PAUL T. WINSLOW, ALL OF NIVERVILLE, NEW YORK.

SHUT-OFF DEVICE FOR CARBURETERS AND THE LIKE.

1,348,226.     Specification of Letters Patent.     Patented Aug. 3, 1920.

Application filed February 13, 1920. Serial No. 358,473.

*To all whom it may concern:*

Be it known that I, GEORGE E. KIPP, a citizen of the United States, and resident of Niverville, in the county of Columbia and State of New York, have invented certain new and useful Improvements in Shut-Off Devices for Carbureters and the like, of which the following is a specification.

This invention has for its object the provision of a simple, inexpensive and efficient device by the use of which the flow of a combustible fluid will be automatically cut off when the temperature of the air around the device reaches a predetermined degree.

It is well known that for various reasons back-firing in an internal combustion engine frequently occurs and causes combustion of the fuel in the attached carbureter which may be communicated to the fuel supply through the pipe line so that destruction of the entire plant may follow.

To prevent loss of automobiles, motor boats, flying machines, and other vehicles, as a result of such back-firing it has heretofore been proposed to locate in the pipe line immediately adjacent the carbureter, a cut-off valve normally held open by a fuse and instantly closed by a spring when an increase in temperture melts and destroys the fuse.

Specifically stated the object of the present invention is to improve the construction and increase the efficiency of such a valve.

While the device is intended primarily for use in connection with internal combustion engines, it may be employed in other fields without substantial structural changes.

In the accompanying drawings, wherein corresponding reference numerals are used to indicate corresponding parts in each of the several views—

Figure 1 is an elevation of my improved cut-off valve mounted in a pipe line adjacent a carbureter.

Fig. 2 is a vertical longitudinal section of the valve on a larger scale.

Fig. 3 is a view similar to Fig. 2, but taken in a plane, at right angles to the plane of Fig. 2; and Fig. 4 is a sectional plan view on the line IV—IV of Fig. 3.

In the drawings the reference numeral 1 indicates a carbureter which may be of any well known or preferred type, the fuel being carried therefrom to the engine by a manifold feed 2 and supplied to the carbureter through a pipe line 3. Interposed in the pipe line, immediately adjacent the carbureter is a valve casing 4, having a seat 5, therein, with which is engageable a valve disk 6, said valve disk acting in the manner of a check valve. The valve may be inserted into the valve casing through the lower wall thereof, a screw plug 7, being then turned home in the opening in said wall to fill and close the same. The valve seat is formed in a partition or web 8 and the valve stem rises through said partition and through a suitable opening provided therefor in the top wall of the casing, a sleeve 9 being threaded at its lower end into the last mentioned opening. The lower portion of the valve stem is reduced, as at 10, so that it will be out of contact with the walls of the valve seat and chipping or wearing away of these parts will be avoided. The intermediate portion 11, of the valve stem is of greater diameter than its end portions and a spring 12 is coiled around said portion of the stem between a stop 13 thereon and the partition or web 8 so that, if released, it will draw the valve firmly against the seat. The base of the sleeve 9, through its greater portion, is of a diameter large enough to accommodate the spring 12 without contact therewith while in the upper portion of the sleeve the bore is reduced for a short length, as at 14. The reduced portion 14 of the bore is of a diameter to reecive the upper end of the intermediate portion 11 of the stem and guide the same. The upper extremity of the sleeve is reduced and externally threaded, as at 15, to reecive a cap 16, and the upper reduced terminal 17 of the valve stem plays through the bore of the said cap and the sleeve terminal 15, as clearly shown in Figs. 2 and 3. This construction effectually guides the valve stem with a minimum amount of frictional wear. The cap 16 is constructed with a chamber 18 to receive packing 19 to prevent leakage around the valve stem and it will be noted that the upper wall of the packing chamber is concave so that as the cap is turned home the packing will be compressed against the top of the sleeve and also crowded to and around the valve stem and leakage and loss of fuel will be effectually prevented.

Near its lower end, the sleeve 9 is provided with an annular flange 20, which may rest upon the valve casing 4 when the sleeve is turned home, as shown. In the said flange are sockets or recesses 21, opening through the side edge of the flange and radial slots 22, of less width than the sockets provide outlets from the several sockets through the top edge of the flange. Upon the cap 16, is a short post 23, to which is pivoted one end of a lever or latch 24 which extends across the end of the valve stem, a notch 25 being preferably formed in the end of the stem to receive the latch and maintain the operative relation of the parts. The free end of the latch is notched or otherwise constructed to be engaged by the upper end of a fuse 26, the lower end of the fuse passing through a slot 22 and being provided with a knob or other form of stop 27 which fits closely within the corresponding recess 21 and a similar stop 28 at the upper end of the fuse prevents disengagement of the fuse from the latch under normal conditions.

The fuse is preferably of some wire having a low fusing point and normally restrains the latch 24 so that the valve will be held open, as shown, in Figs. 2 and 3. Should a fire occur in the carbureter, the abnormal increase in temperature in the immediate vicinity of the valve and the contacting of the flame from back-firing, with the fuse, will cause the fuse to separate, whereupon the spring 12 will be freed and will expand, closing the valve and cutting off the fuel so that the fire will be at once extinguished.

It will be noted that a plurality of slots 22 and sockets 21 are provided so that no matter what position may be reached by the post 23 and the latch 24 when the cap 26 is turned home, there will be a slot 22 in the same plane with the latch so that the fuse may be fitted in its proper position without lateral bending.

It will also be noted that the fuse is not secured in place by screws or other fastenings and may, therefore, be fitted in its proper position. Moreover, if extra fuses be carried, the parts may be restored to a working condition without appreciable loss of time, and, in some instances, without stopping the motor but for a very short period due to the failure of fuel supply. Furthermore, especially when used on flying machines, when a fuse has been blown and the fire stopped by the cutting off of fuel, the mechanician may press upon the latch so as to open the valve by hand and reëstablish the flow of fuel before the engine loses its momentum and if the back firing continues can instantly close the valve, and if the back firing has ceased then a new fuse may be put in position.

The device is exceedingly simple and inexpensive and highly efficient in use.

If desired the pivot pin of the latch 24 may be made of fusible material, and an additional means of releasing the latch and closing the valve thus provided.

Having thus full described my invention, what I claim as new and desire to secure by Letters Patent of the United States, is—

1. The combination of a valve casing, a valve therein having its stem projecting beyond the casing, a latch pivoted on the casing and extending across and bearing on the end of the valve stem, a socket in the valve casing having an open outer end and having an opening through its top, and a fuse wire for normally holding the valve in one position having its lower end extending through the opening in the top of the socket and provided with a stop fitting closely in the socket, the upper end of the fuse engaging the free end of the latch and provided with a stop bearing upon the upper side of the latch.

2. The combination of a valve casing, a valve therein having its stem projecting beyond the casing, a latch pivoted on the casing and extending across and bearing on the end of the valve stem, a plurality of sockets in the valve casing, each socket having an open outer end and having an opening through its top, and a fuse wire for normally holding the valve in one position having its lower end extending through the opening in the top of the appropriate socket and provided with a stop fitting closely in said socket, the upper end of the fuse engaging the free end of the latch and provided with a stop bearing upon the upper side of the latch.

GEORGE E. KIPP.